United States Patent
Neville et al.

(10) Patent No.: US 7,423,827 B2
(45) Date of Patent: Sep. 9, 2008

(54) SYSTEMS AND METHODS FOR ACCESSING DATA FROM A VARIABLE POLARITY HEAD ASSEMBLY

(75) Inventors: Roy S. Neville, Allentown, PA (US); Viswanath Annampedu, Schnecksville, PA (US); Keith R. Bloss, Schnecksville, PA (US); Vishal Narielwala, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 230 days.

(21) Appl. No.: 11/408,825

(22) Filed: Apr. 20, 2006

(65) Prior Publication Data

US 2007/0247735 A1    Oct. 25, 2007

(51) Int. Cl.
*G11B 5/09* (2006.01)

(52) U.S. Cl. .............................. 360/51; 360/39; 360/46; 360/53

(58) Field of Classification Search .................. None
See application file for complete search history.

(56) References Cited

U.S. PATENT DOCUMENTS

| | | | |
|---|---|---|---|
| 3,973,182 A | | 8/1976 | Kataoka |
| 3,973,183 A | | 8/1976 | Kataoka |
| 4,024,571 A | * | 5/1977 | Dischert et al. ................. 386/2 |
| 5,341,249 A | * | 8/1994 | Abbott et al. .................. 360/46 |
| 5,798,885 A | * | 8/1998 | Saiki et al. ................ 360/77.08 |
| 5,844,920 A | * | 12/1998 | Zook et al. ................... 714/769 |
| 5,852,524 A | * | 12/1998 | Glover et al. ................. 360/51 |
| 6,009,549 A | * | 12/1999 | Bliss et al. ................... 714/769 |
| 6,278,591 B1 | | 8/2001 | Chang |
| 6,441,661 B1 | * | 8/2002 | Aoki et al. ................... 327/159 |
| 6,490,110 B2 | * | 12/2002 | Reed et al. ..................... 360/48 |
| 6,493,162 B1 | | 12/2002 | Fredrickson |
| 6,603,622 B1 | * | 8/2003 | Christiansen et al. .......... 360/66 |
| 6,646,822 B1 | * | 11/2003 | Tuttle et al. ................... 360/46 |
| 6,963,521 B2 | | 11/2005 | Hayashi |
| 6,999,257 B2 | | 2/2006 | Takeo |
| 6,999,264 B2 | | 2/2006 | Ehrlich |
| 7,206,146 B2 | * | 4/2007 | Flynn et al. .................... 360/39 |
| 2002/0150179 A1 | * | 10/2002 | Leis et al. ..................... 375/340 |
| 2003/0095350 A1 | * | 5/2003 | Annampedu et al. .......... 360/39 |
| 2005/0157415 A1 | | 7/2005 | Chiang |

OTHER PUBLICATIONS

Viswanath Annampedu and Pervez M. Aziz, "Adaptive Algorithms for Asynchronous Detection of Coded Servo Signals Based on Interpolation," IEEE Transactions on Magnetics, vol. 41, No. 10, Oct. 2005.

* cited by examiner

*Primary Examiner*—Hoa T. Nguyen
*Assistant Examiner*—Dismery Mercedes
(74) *Attorney, Agent, or Firm*—Hamilton, DeSanctis & Cha (57) ABSTRACT

Various systems and methods for accessing data via a variable polarity head assembly are disclosed herein. As one example, a method for accessing data is disclosed that includes receiving a data set, and sampling the data set using positive synchronization to create one data set and negative synchronization to create another data set. A respective sync mark is identified in each of the data sets, and the identified sync marks are compared. Based at least in part on the comparison of the sync marks, a polarity of the data set is identified. Based on the determined polarity of the data set, the data set may be delivered in a known polarity.

20 Claims, 5 Drawing Sheets

SYSTEMS AND METHODS FOR ACCESSING DATA FROM A VARIABLE POLARITY HEAD ASSEMBLY

BACKGROUND OF THE INVENTION

The present invention relates generally to accessing storage media, and more particularly without limitation to systems and methods compensating for head assembly polarity in relation to accessing storage media.

Various storage media are used to store information. In a typical implementation, data is written to and read from a disc using a read/write head assembly that is disposed near the surface of the disc. In an effort to increase the potential information storage density, the geometry of the head assemblies have been substantially reduced and materials used to form the head assemblies have changed. While these advancements have allowed for increased data storage, they have also resulted in various undesirable affects. For example, the polarity of head assemblies is known to invert. When the polarity of a head assembly inverts, the signal read back from the disc is inverted from the expected polarity. This results in an inability to read data from the disc.

Some solutions to this problem include providing a user selectable switch that allows a user to invert the head assembly when the user notices a number of read errors. This may be an effective solution where polarity inversion is very infrequent. However, this solution is not effective where inversion of the head assembly happens more than once or twice in the lifetime of the head assembly. Another solution automatically switches the polarity of the head assembly after a period of failed reads is detected. After the period of failed reads, the polarity of the head assembly is inverted. While this solution is automatic, it can have a devastating impact on the rate at which data from a disc can be read. Further, this impact may be highly unpredictable where the frequency at which the head assembly is changing polarity is variable.

Hence, for at least the aforementioned reasons, there exists a need in the art for advanced systems and methods accessing data using a variable polarity head assembly.

BRIEF SUMMARY OF THE INVENTION

The present invention relates generally to accessing storage media, and more particularly without limitation to systems and methods compensating for head assembly polarity in relation to accessing storage media.

Various embodiments of the present invention provide methods for accessing data using a variable polarity head assembly. Such methods include receiving a data set, and sampling the data set using positive synchronization to create one data set and negative synchronization to create another data set. A respective sync mark is identified in each of the data sets, and the identified sync marks are compared. Based at least in part on the comparison of the sync marks, a polarity of the data set is identified. Based on the determined polarity of the data set, delivering the data set in a positive polarity. In some cases, one of the sync marks is an inverted version of the other sync mark.

In some instances, the positive synchronization is achieved by one phase lock loop synchronizing to the maximum peaks of a portion of the received data stream, and the negative synchronization is achieved by another phase lock loop synchronizing to the minimum peaks of another portion of the received data stream. In other instances, the positive synchronization is achieved by one phase lock loop synchronizing to the maximum peaks of a portion of the received data stream, and the negative synchronization is achieved by another phase lock loop synchronizing to the maximum peaks an inverted version of the data set.

In particular cases, comparing the sync marks includes summing the individual samples of one of the sync marks to create one sync mark sum, and summing the individual samples of the other sync mark to create another sync mark sum. The sync mark sums may then be compared. Positive polarity of the data stream is indicated for the sync mark sum with the highest value. In addition, the received data set may be wide biphase coded.

In some cases, the sync marks are preceded by a preamble. In such cases, the preamble may be used by a phase lock loop circuit to synchronize a sample clock used to sample the data stream with the data stream.

Other embodiments of the present invention provide storage systems that include two data paths each with a synchronization element, a sampling element, and a sync detector. Each of the synchronization elements is operable to synchronize a sample clock to respective phases of a frequency of a received data stream. In some cases, the respective phases are approximately one hundred eighty degrees apart. Each of the sampling elements is operable to sample the received data stream and to create a respective sample set based on an input from a respective one of the synchronization elements. Each of the sync detectors is operable to identify a sync mark in the respective sample sets. The systems further include a comparator that is operable to compare the first sync mark with the second sync mark, and to output an indication of the polarity of the received data stream.

In some instances of the aforementioned embodiments, the systems further include a storage medium and a read head disposed in a read proximity to the storage medium. In such instances, the received data stream is provided from the storage medium via the read head. In various instances of the aforementioned embodiments, the systems further include accumulators associated with each of the two data paths, and the accumulators are operable to sum the individual samples of the respective sync mark to create respective sync sums. In such instances, comparison of the sync mark may include comparison of the sync sums.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention relates generally to accessing storage media, and more particularly without limitation to systems and methods compensating for head assembly polarity in relation to accessing storage media.

Various embodiments of the present invention provide methods for accessing data using a variable polarity head assembly. As used herein, the phrase "head assembly" is used in its broadest sense to mean any device capable of reading and/or writing data from and/or to a storage medium. Also, as used herein, the phrase "variable polarity" is used in its broadest sense to mean any modification in polarity or phase such as, for example, a switch between positive polarity and a negative polarity where negative polarity indicates a substantially inverted signal compared to a corresponding positive polarity signal. As used herein, "positive polarity" generally refers to an intended signal polarity. The aforementioned methods further include receiving a data set, and sampling the data set using positive synchronization to create one data set and negative synchronization to create another data set. As used herein, the phrase "positive synchronization" is used in its broadest sense to mean synchronizing to a positive portion of a signal such as, for example, a maximum peak signal value. Also, as used herein, the phrase "negative synchronization" is used in its broadest sense to mean synchronizing to a negative portion of a signal such as, for example, a minimum peak signal value or a maximum peak signal value of an inverted signal. The methods further include identifying sync marks in each of the respective data sets and comparing the sync marks. As used herein, the phrase "sync mark" is used in its broadest sense to mean any group of bits or sample values within a larger data set that may be used to indicate a start, end or other interim location within the larger data set. Based at least in part on the comparison of the sync marks, a polarity of the data set is identified.

In particular cases of the aforementioned methods, comparing the sync marks includes summing the individual samples of one of the sync marks to create one sync mark sum, and summing the individual samples of the other sync mark to create another sync mark sum. The sync mark sums may then be compared. In one particular case, positive polarity of the data stream is indicated for the sync mark sum with the highest value.

In some cases, the sync marks are preceded by a preamble that may be used to synchronize or otherwise guide sampling of the succeeding sync mark. In one particular case, one or more phase lock loop circuits are used to synchronize to the maximum peaks or the minimum peaks of the preamble, and the samples of the succeeding sync marks are taken using the synchronization with the preamble. Based on the disclosure provided herein, one of ordinary skill in the art will recognize other approaches in addition to a phase lock loop that can be used to cause sampling to occur at maximum peaks and/or minimum peaks.

Figure 1:
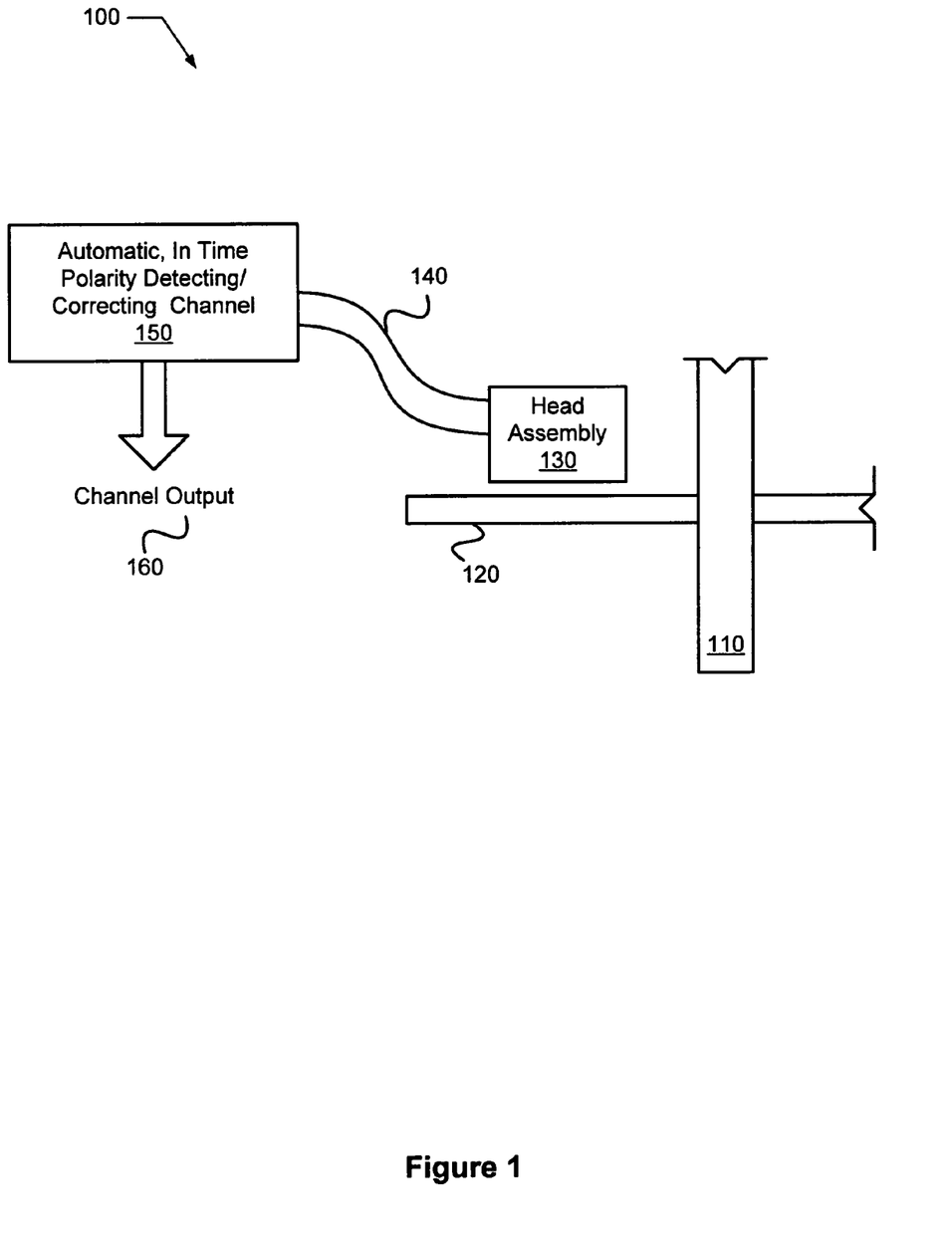
FIG. 1 depicts a system including an automatic, in time polarity detecting/compensating channel in accordance with some embodiments of the present invention.

Turning to FIG. 1, a system 100 is depicted in accordance with one or more embodiments of the present invention. In particular, system 100 includes an automatic, in time polarity detecting/compensating channel 150 capable of receiving information from a read/write head assembly 130 via a flex connector 140. The information received from read/write head assembly 130 is provided as a channel output 160. Read/write head assembly 130 is disposed near the surface of a storage medium 120. Storage medium 120 may be rotated about a spindle 110 and read/write head assembly 130 may be moved in relation to storage medium 120 such that read/write head assembly 130 is properly positioned over storage medium 120 to read and/or write information.

For one or more reasons, the polarity of read/write head assembly 130 may become inverted. In such a circumstance, the polarity of the signal provided by read/write head assembly 130 to automatic, in time polarity detecting/compensating channel 150 may be inverted from that which was originally written to storage medium 120. Automatic, in time polarity detecting/compensating channel 150 is capable of detecting such an inverted condition and providing a corrected version of the read data via channel output 160. In such cases, automatic, in time polarity detecting/compensating channel 150 can apply such a correction without the loss of any read data. In some cases, some data may be lost at the time the polarity of read/write head assembly 130 switches polarity, but the losses stop once read/write head assembly 130 traverses the next wedge of sector data including a preamble and sync mark.

Figure 2A:
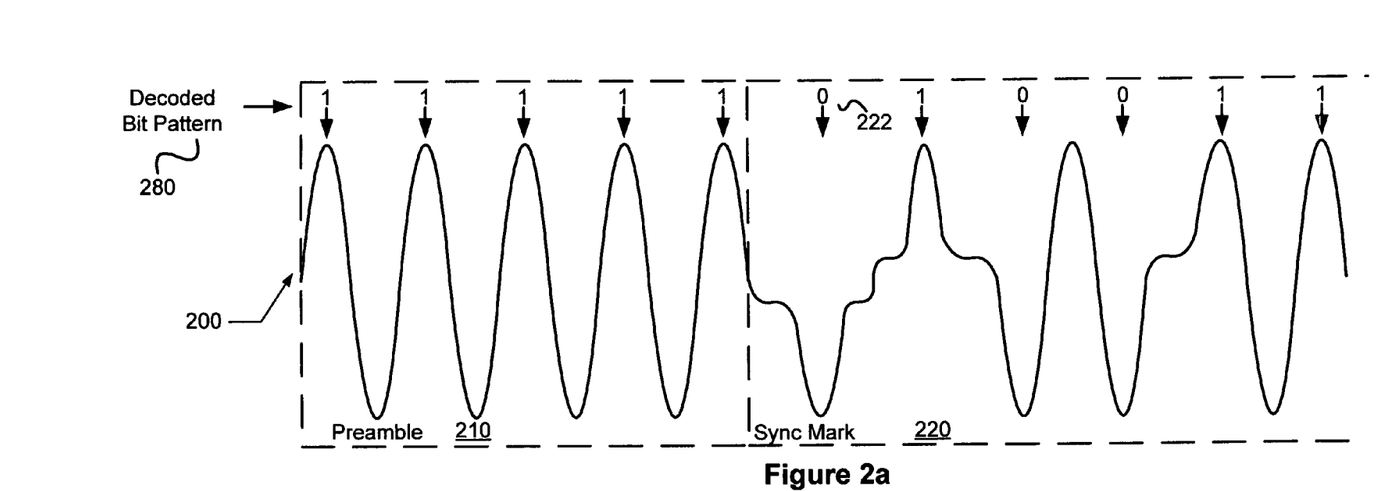
FIG. 2A shows a positive polarity signal retrieved from the storage medium of FIG. 1.

Turning to FIG. 2A, a non-inverted combination preamble and sync pattern 200 is depicted. In particular, pattern 200 includes a preamble 210 which is a wave oscillating at a particular frequency and a sync mark 220 which yields a known bit pattern when sampled at the frequency and phase of preamble 210. Thus, following pattern 200, a sample clock is synchronized to the maximum peaks of preamble 210 yielding the first portion of a decoded bit pattern 230 of '11111' (i.e., preamble 210). This synchronization with preamble 210 is maintained through the sampling of sync mark 220 which is triggered by an initial '0' bit 222. From this point, the succeeding bits in sync mark 220 are sampled. As shown, preamble 210 is '11111' and sync mark 220 is "0100 . . . " At this point, it should be noted that the sampled "bits" may be values represented by multiple bits that can be threshold compared for reduction to a single binary bit.

Sync mark 220 may be any number of bits or samples depending on a particular design. In some embodiments of the present invention, sync mark 220 is selected as '0001'. Further, in one particular embodiment of the present invention, the aforementioned both the preamble and sync mark are wide biphase encoded with '0'='1100' and '1'='0011'. Thus, when such an encoding is used, preamble 210 is 001100110011 . . . and ends in 0011. Where sync mark 220 is selected as '0001' its corresponding wide biphase encoding is 1100110011000011. The combination of the last bit of preamble 210 and the first bit of sync mark 230 would be: 00111100.

Figure 2B:
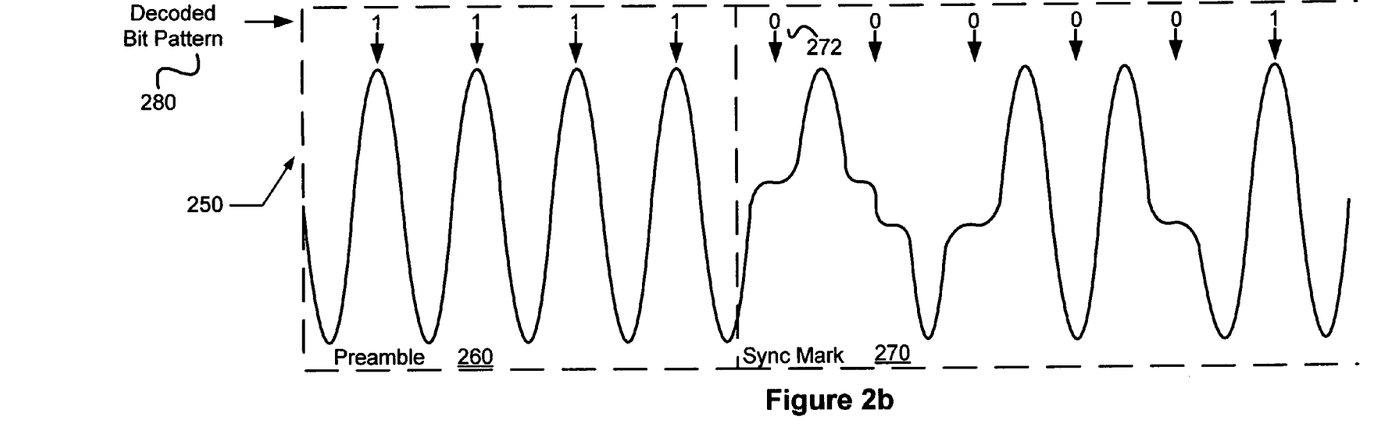
FIG. 2B shows a negative polarity signal retrieved from the storage medium of FIG. 1.

Turning to FIG. 2B, an inverted combination preamble and sync pattern 250 is depicted (i.e., pattern 250 is an inverted version of pattern 200). In particular, pattern 250 has a preamble 260 consisting of a series of '1' samples corresponding to the maximum peak values, and a sync mark 270 indicated by an initial '0' sample 272. However, because pattern 250 is inverted, synchronization to the maximum peaks of preamble 260 represents synchronization to the minimum peaks of pattern 200. This causes a phase shift of approximately one-hundred eighty degrees and results in an improper sampling of sync mark 270. Further, because sync mark 270 is inverted, improper sampling occurs for this additional reason. As an example, in the illustrated case, sync mark 270 is detected as '0000.

For the purposes of this application, it is assumed that the polarity of read/write head 130 cannot be completely controlled, but only detected, compensated and/or corrected. To this end, various embodiments of the present invention provide dual data path processing that allows for detecting an appropriate sync mark in one or the other data path. For purposes of discussion, one of the data paths is referred to as a positive data path and the other is referred to as a negative data path. The positive data path will properly detect a sync mark when non-inverted data is received from read/write head assembly 130, and the negative data path will properly detect the sync mark when inverted data is received from read/write head assembly 130.

The data path that yields the proper sync mark is used to process data to channel output 160. Thus, channel output 160 always provides data in a prescribed polarity regardless of the polarity of read/write head 130. Based on the disclosure provided herein, one of ordinary skill in the art will recognize a variety of dual path implementations that may be used to deliver a polarity inverting data stream in a known polarity. For example, synchronization may be done in one data path on maximum peaks of the incoming data and the sampled data is delivered as is, while in the other data path synchronization may be done on the minimum peaks of the incoming data and the sampled data is inverted before being inverted.

Figure 3:
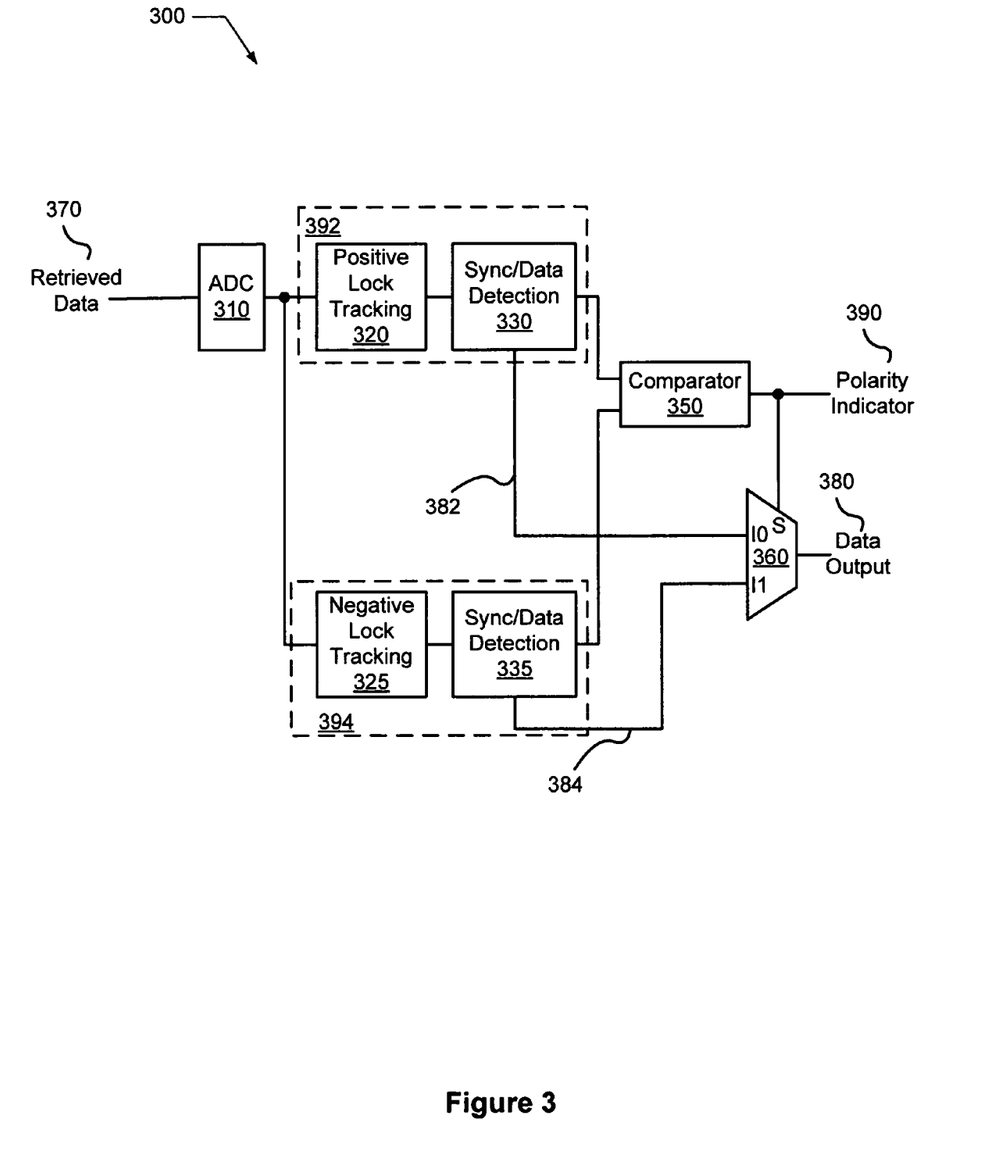
FIG. 3 is a block diagram of a polarity detecting/compensating circuit in accordance with various embodiments of the present invention.

Turning to FIG. 3, a block diagram is provided of a polarity detecting/compensating circuit 300 in accordance with various embodiments of the present invention. Polarity detecting/compensating circuit 300 includes an analog to digital converter 310 that receives data 370 retrieved from a storage medium via a read/write head assembly. Polarity detecting/compensating circuit 300 includes two paths 392, 394 each indicated by circuitry within a dashed box, and each having similar circuitry. Paths 392, 394 each receive retrieved data 370 as converted by analog to digital converter 310. In particular, path 392 includes a positive lock tracking circuit 320 and a sync/data detection circuit 330, whereas path 394 includes a negative lock tracking circuit 325 and a sync/data detection circuit 335. A comparator circuit 350 receives a detected sync mark from each of paths 392, 394. Comparator circuit 350 provides a polarity indicator output 390 that is provided as a selector input to a multiplexer 360. Multiplexer 360 also receives a sampled data stream 382 from path 392, and sampled data stream 384 from path 394. Based on polarity indicator output 390, one of data streams 382, 384 is provided as a data output 380.

In operation, retrieved data 370 is received from a storage medium via a read/write head assembly. Retrieved data 370 is converted to a digital approximation thereof, and the digital approximation is provided to both data path 392 and data path 394 for parallel processing. Data path 392 processes the received data as if retrieved data 370 had not been inverted by the read/write head assembly, while data path 394 processes the received data as if retrieved data 370 had been inverted by the read/write head assembly.

In particular, positive lock tracking circuit 320 synchronizes a sample clock to the maximum peaks of received signal. With this lock established, sync/data detection circuit 330 samples the data stream using the synchronized clock and seeks to identify the sync mark within the data stream. In addition, sync/data detection circuit 330 samples the received data using the synchronized sample clock to create data stream 382 that is provided to multiplexer 360.

In contrast, negative lock tracking circuit 325 inverts the received signal and synchronizes a sample clock to the maximum peaks of the inverted, received signal. With this lock established, sync/data detection circuit 335 samples the inverted data stream using the synchronized clock and seeks to identify the sync mark within the inverted data stream. Further, sync/data detection circuit 335 samples the inverted, received data using the synchronized sample clock to create data stream 384 that is provided to multiplexer 360.

Comparator circuit 350 determines whether path 392 or path 394 properly detected an appropriate sync mark. Once this is determined, comparator circuit 350 provides polarity indicator output 390 that indicates which of paths 392, 394 include the non-inverted data. Polarity indicator output 390 may be provided to other circuitry associated with polarity detecting/compensating circuit 300 that has a need to know whether retrieved data 370 is inverted or not. Further, polarity indicator output 390 is provided as a selector input to multiplexer 360. Where polarity indicator output 390 is asserted high, inverted data stream 384 from path 394 sampled and provided by sync/data detection circuit 335 is provided as data output 380. Alternatively where polarity indicator output 390 is asserted low, non-inverted data stream 382 from path 392 sampled and provided by sync/data detection circuit 330 is provided as data output 380.

Based on the disclosure provided herein, one of ordinary skill in the art will recognize other implementations of path 394 that operate in a complimentary fashion to path 392 to assure that one or the other of paths 392, 394 detects the incoming sync mark and provides an appropriate data output. For example, negative lock tracking circuit 325 may be implemented to operate directly on the non-inverted, received input rather than first inverting the received input. In such a case, negative lock tracking circuit 325 may be design to synchronize a sample clock to the minimum peaks of the non-inverted, received signal. With this lock established, sync/data detection circuit 335 samples the non-inverted data stream using the synchronized clock and inverts each of the samples to form a data set. Sync/data detection circuit 335 parses through the data set to identify the sync mark. In addition, sync/data detection circuit 335 samples the non-inverted, received data using the synchronized sample clock and inverts each of the sampled bits to create data stream 384 that is provided to multiplexer 360.

Figure 4:
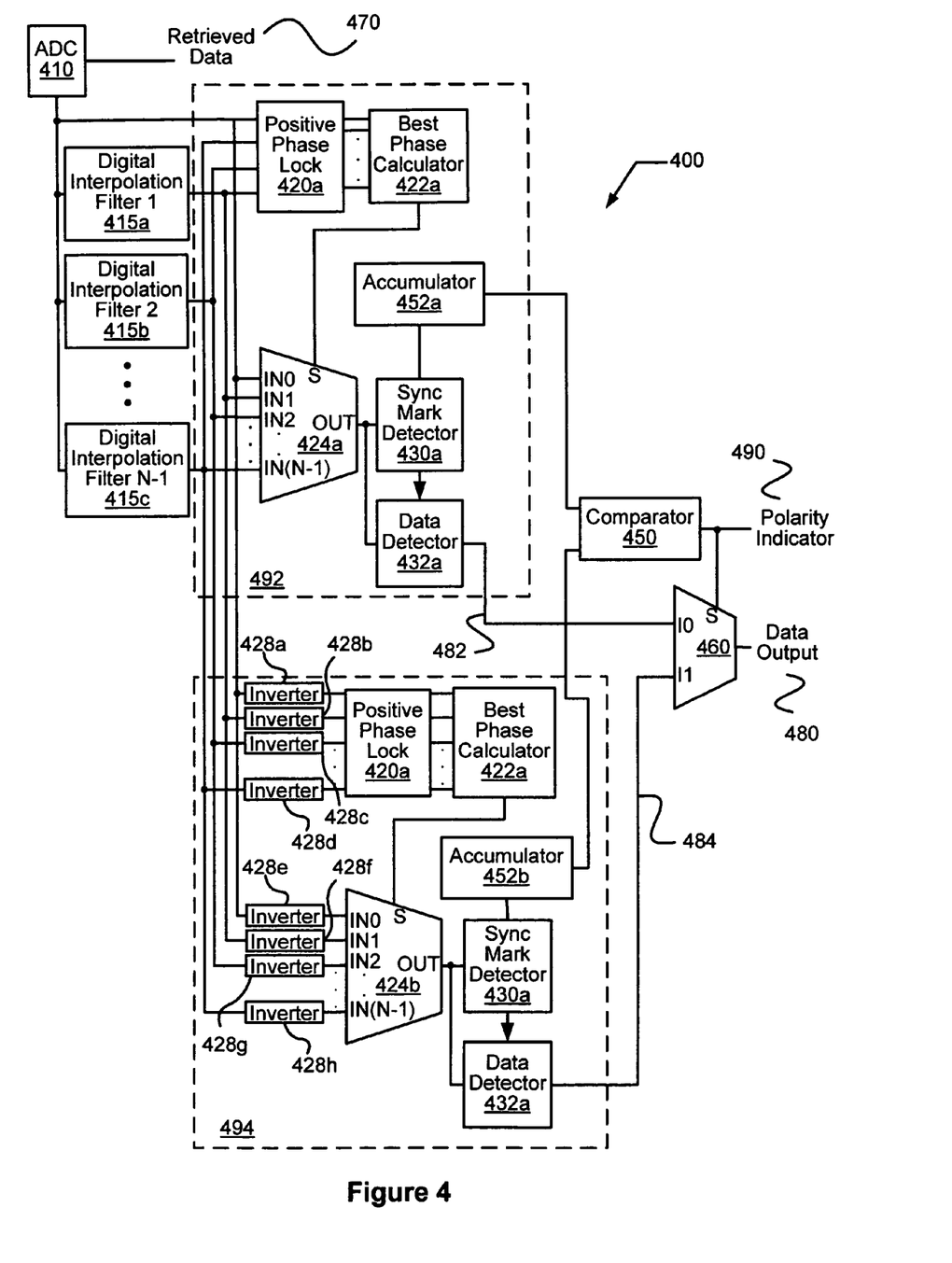
FIG. 4 is a block diagram of a particular polarity detecting/compensating circuit in accordance with one or more embodiments of the present invention.

Turning to FIG. 4, a block diagram is provided of a particular polarity detecting/compensating circuit 400 in accordance with one or more embodiments of the present invention. Polarity detecting/compensating circuit 400 includes an analog to digital converter 410 that receives data 470 retrieved from a storage medium via a read/write head assembly. Polarity detecting/compensating circuit 400 includes two paths 492, 494 each indicated by circuitry within a dashed box, and each having similar circuitry. Paths 492, 494 each receive retrieved data 470 as converted by analog to digital converter 410. In particular, path 492 includes a positive phase lock circuit 420a that receives multiple phases of the received signal from a set of digital interpolation filters 415. In one particular embodiment of the present invention, seven digital interpolation filters 415 are utilized such that eight phases of received data 470 are provided to positive phase lock 420a. Positive phase lock 420a provides a corresponding number of outputs to a best phase calculator circuit 422a which selects the appropriate phase via a multiplexer 424a. The selected phase is provided to a sync mark detector circuit 430a and to a data detector circuit 432a. Sync mark detector circuit 430a drives an accumulator circuit 452a that in turn drives a comparator circuit 450. Data detector circuit 432a provides a detected data stream 482 from path 492 to a multiplexer 460.

Path 494 includes another positive phase lock circuit 420b that receives multiple phases of the received signal from digital interpolation filters 415. Positive phase lock 420b provides a number of outputs that correspond to the number of phases of retrieved signal 470 to another best phase calculator circuit 422b which selects the appropriate phase via another multiplexer 424b. The selected phase is provided to another sync mark detector circuit 430b and to another data detector circuit 432b. Sync mark detector circuit 430b drives an accumulator circuit 452b that in turn drives a comparator circuit 450. Data detector circuit 432b provides a detected data stream 484 from path 494 to multiplexer 460.

Comparator circuit 450 receives the accumulated value of the sync mark from each of paths 492, 494. Based on these inputs, comparator circuit 450 provides a polarity indicator output 490 as a selector input to multiplexer 460. Based on polarity indicator output 490, multiplexer 460 provides one of data streams 482, 484 as a data output 480.

In operation, retrieved data 470 is received from a storage medium via a read/write head assembly and converted to a digital approximation by analog to digital converter 410. As one example, the following stream of digital values may be obtained from analog to digital converter 410: [ . . . 0, 20, 0, −20, 0, 20 . . . 0, −20, 0, 20, 10, 0, −10, −20, 0, 20, 0, −20, 0, 20, 0, −20, −10, 0, 10, 20 . . . ]. This stream of digital values is provided directly to positive phase lock 420a and indirectly thereto via one or more digital interpolation filters 415.

If analog to digital converter 410 is not synchronized to a sample clock, then the ideal stream of digital values may be obtained from one of digital interpolators 415. Positive phase lock circuits 420 identify the maximum peak value for the incoming stream of digital values (i.e., positive phase lock circuit 420a identifies the maximum peak value for a non-inverted version of the stream of digital values, and positive phase lock circuit 420b identifies the maximum peak value for an inverted version of the stream of digital values), and synchronizes a sample clock to the frequency of the incoming stream of digital values. Best phase calculator circuits 422 select the phase of the incoming stream of digital values that provides a maximum value, and select this phase via multiplexers 424. In some embodiments, the best phase samples will lock onto the maximum peaks during the preamble period and make threshold detection on the maximum peak of the samples every four periods. Thus, using the exemplary stream of digital values received from analog to digital converter 410, the selected best phase would yield the following samples: [ . . . 20, 20, 20, −20, −20, −20, 20 . . . ]. The first three '20s' are indicative of the maximum peak of the last bits of the preamble preceding the sync mark, and the three '−20s' and following '20' represents the sync mark '0001' where a value greater than zero corresponds to a '1' and a value less than zero corresponds to a '0'. Thus, using the best phase information provided via multiplexers 424, sync mark detectors 430 are able to identify the sync mark where the signal polarity is positive polarity.

In contrast, where the polarity of retrieved data 470 is inverted, the following stream of digital values may be obtained from analog to digital converter 410: [ . . . 0, −20, 0, 20, 0, −20 . . . 0, 20, 0, −20, −10, 0, 10, 20, 0, −20, 0, 20, 0, −20, 0, 20, 10, 0, −10, −20 . . . ]. In this case, positive phase lock circuit 420a again locks onto the maximum peaks yielding the following best phase samples every four periods: [ . . . 20, 20, 0, −20, −20, 0 . . . ] which corresponds to a sync mark of 'X00X' where a value greater than zero corresponds to a '1', a value less than zero corresponds to a '0', and a value of zero is indeterminate. In such a case, the appropriate sync mark is less likely to be detected as some of the bits are indeterminate.

However, an inverted replica of retrieved data 470 is provided to path 494 where it is inverted using a set of inverters 428. In some embodiments of the present invention inverters 428 form a two's compliment of the output from analog to digital converter 410 and digital interpolators 415 before providing the stream of digital values to positive phase lock circuit 420b and best phase calculator circuit 422b for phase locking and selection. The processing of the inverted signal along path 494 is the same as processing along path 492. In this case, however, where retrieved data 470 is positive polarity, the sync mark is less likely to be detected. But, when retrieved data 470 is negative polarity, the sync mark is detected.

Regardless of the polarity of retrieved data 470, both paths 492, 494 process in parallel using accumulators 452 to create a sum of the absolute values associated with the sync mark. Thus, for example, where the sync mark '0001' is associated with the following series of samples '−20, −20, −20, 20'; the sum of the absolute values formed by a respective accumulator is eighty, and indicates that the sync mark was detected. Alternatively, where the sync mark 'X00X' is identified from the following series of samples 0, −20, −20, 0; the sum of the absolute values formed by a respective accumulator is forty, and indicates that the sync mark was not detected. Said another way, where retrieved data 470 is not inverted, accumulator 452a will yield a value greater than that of accumulator 452b. In contrast, where retrieved data 470 is inverted, accumulator 452a will yield a value less than that of accumulator 452b. Comparator 450 receives the values from accumulators 452 and provides polarity indicator output 490 indicating which of paths 492, 494 is providing a positive polarity data stream. It should be noted that the same sync mark may be detected by both data paths due to the indeterminate nature of one of the sync marks. In such a case, the sum of absolute values acts as an arbiter between the two identified sync marks.

In addition, sync mark detector circuits 430 provide an indication to associated data detector circuits 432 indicating that data is available as part of the stream of digital values received from multiplexers 424. The stream of digital values is sampled by data detector circuits 432 using the synchronized sample clock, and the samples are provided to multiplexer 460 respectively as data streams 482, 484. Based on polarity indicator output 490, one or the other of data streams 482, 484 is passed by multiplexer 460 as data output 480.

Figure 5:
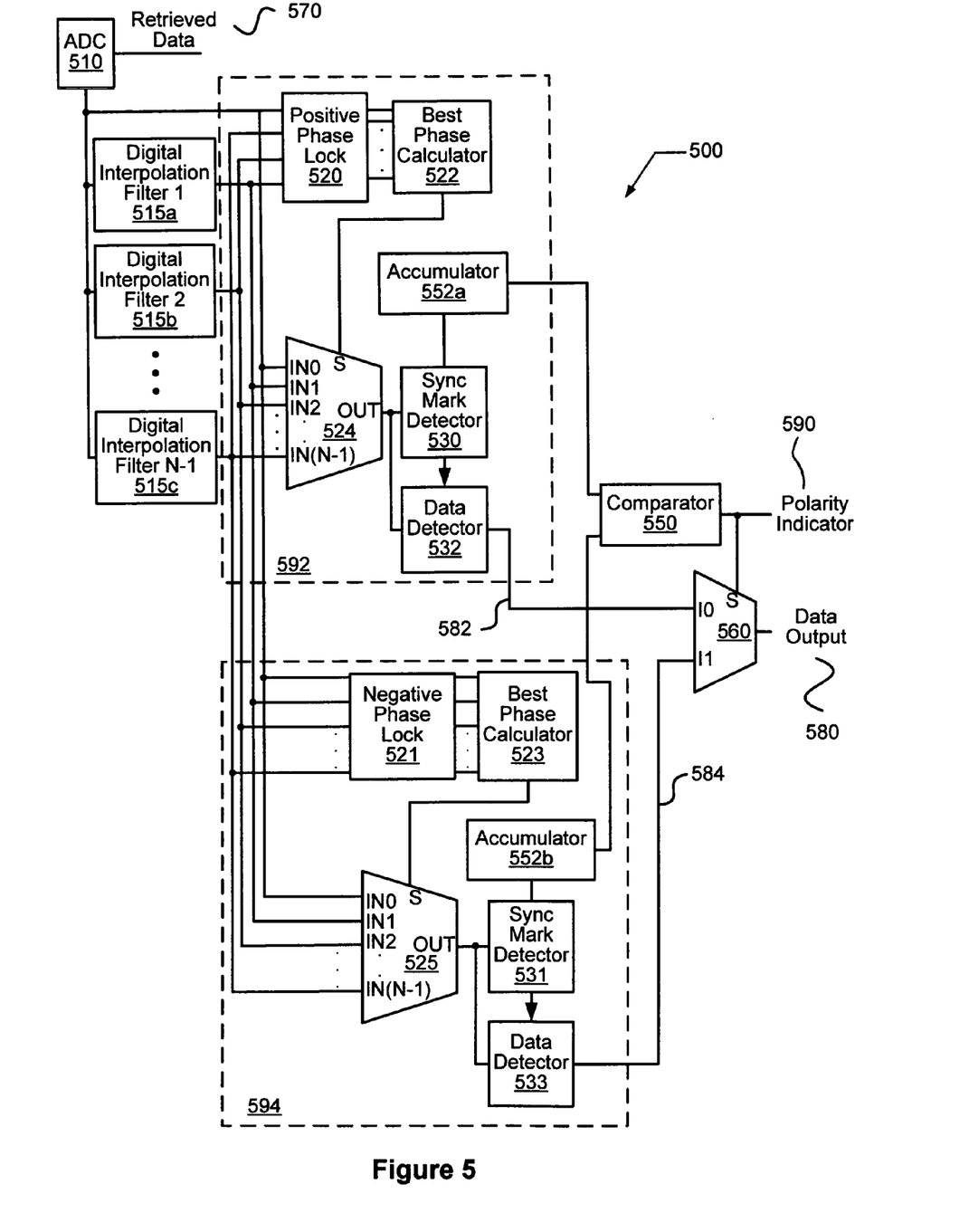
FIG. 5 is a block diagram of another particular polarity detecting/compensating circuit in accordance with one or more other embodiments of the present invention.

Turning to FIG. 5, a block diagram depicts another particular polarity detecting/compensating circuit 500 in accordance with one or more other embodiments of the present invention. In contrast to that discussed in relation to circuit 400, circuit 500 does not rely on inverting the output of an analog to digital controller and using the same circuitry for processing both the inverted and non-inverted outputs of the analog to digital converter. Rather, particular polarity detecting/compensating circuit 500 using a different tracking method to synchronize with the stream of digital values provided from an analog to digital converter 510.

Polarity detecting/compensating circuit 500 includes an analog to digital converter 510 that receives data 570 retrieved from a storage medium via a read/write head assembly. Polarity detecting/compensating circuit 500 includes two paths 592, 594 each indicated by circuitry within a dashed box, and each having similar circuitry. Paths 592, 594 each receive retrieved data 570 as converted by analog to digital converter 510. In particular, path 592 includes a positive phase lock circuit 520 that receives multiple phases of the received signal from a set of digital interpolation filters 515. In one particular embodiment of the present invention, seven digital interpolation filters 515 are utilized such that eight phases of received data 570 are provided to positive phase lock 520. Positive phase lock 520 provides a corresponding number of outputs to a best phase calculator circuit 522 which selects the appropriate phase via a multiplexer 524. The selected phase is provided to a sync mark detector circuit 530 and to a data detector circuit 532. Sync mark detector circuit 530 drives an accumulator circuit 552a that in turn drives a comparator circuit 550. Data detector circuit 532 provides a detected data stream 582 from path 592 to a multiplexer 560.

Path 594 includes a negative phase lock circuit 521. In contrast to positive phase lock circuit 521 that synchronizes the maximum peaks of the preamble, negative phase lock circuit synchronizes to minimum or negative peaks of the preamble. Negative phase lock circuit 521 receives multiple phases of the received signal from digital interpolation filters 515. Negative phase lock 521 provides a number of outputs that correspond to the number of phases of retrieved signal 570 to a best phase calculator circuit 523 which selects the appropriate phase via another multiplexer 525. The selected phase is provided to a sync mark detector circuit 531 and to a data detector circuit 533. Sync mark detector circuit 531 drives an accumulator circuit 552b that in turn drives comparator circuit 550. Data detector circuit 533 provides a detected data stream 584 from path 594 to multiplexer 560.

Comparator circuit 550 receives the accumulated value of the sync mark from each of paths 592, 594. Based on these inputs, comparator circuit 550 provides a polarity indicator output 590 as a selector input to multiplexer 560. Based on polarity indicator output 590, multiplexer 560 provides one of data streams 582, 584 as a data output 580.

In operation, retrieved data 570 is received from a storage medium via a read/write head assembly and converted to a digital approximation by analog to digital converter 510. Using the same example previously used in relation to circuit 400, the following stream of digital values may be obtained from analog to digital converter 510: [ . . . 0, 20, 0, −20, 0, 20 . . . 0, −20, 0, 20, 10, 0, −10, −20, 0, 20, 0, −20, 0, 20, 0, −20, −10, 0, 10, 20 . . . ]. This stream of digital values is provided directly to positive phase lock 520 and indirectly via one or more digital interpolation filters 515.

If analog to digital converter 510 is not synchronized to a sample clock, then the ideal stream of digital values may be obtained from one of digital interpolators 515. Positive phase lock circuit 520 identifies the maximum peak value for the incoming stream of digital values and negative phase lock circuit 521 identifies the minimum peak value for the incoming stream of digital values. In both cases, the phase lock circuits synchronize respective sample clocks to the frequency associated with the incoming stream of digital values. Best phase calculator circuit 522 selects the best phase where the maximum peak values are achieved, and selects this phase via multiplexer 524.

In some embodiments, the best phase calculator circuit 522 locks onto the maximum peaks during the preamble period and make threshold detection on the maximum peak of the samples every four periods. Thus, using the exemplary stream of digital values received from analog to digital converter 510, the selected best phase where the retrieved data is not inverted would yield the following samples: [ . . . 20, 20, 20, −20, −20, −20, 20 . . . ]. The first three '20s' are indicative of the maximum peak of the last bits of the preamble preceding the sync mark, and the three '−20s' and following '20' represents the sync mark '0001' where a value greater than zero corresponds to a '1' and a value less than zero corresponds to a '0'. Thus, using the best phase information provided via multiplexer 524, sync mark detector 530 is able to identify the sync mark where the signal polarity is positive polarity. Alternatively, where retrieved data 570 is inverted, the selected best phase would yield the following samples: ' . . . 20, 20, 0, −20, −20, 0 . . . ' which corresponds to a sync mark of 'X00X' where a value greater than zero corresponds to a '1', a value less than zero corresponds to a '0', and a value of zero is indeterminate. In such a case, the appropriate sync mark is not detected and some bits are indeterminate. Thus, when retrieved data 570 is not inverted, path 592 properly identifies a sync mark, but when retrieved data 570 is inverted path 592 has a lower probability of identifying a sync mark.

In contrast, best phase calculator circuit 523 selects the best phase where the minimum peak values are achieved, and selects this phase via multiplexer 525. Where retrieved data 570 is not inverted, the selected best phase would yield the following samples: ' . . . 20, 20, 0, −20, −20, 0 . . . ' which corresponds to a sync mark of 'X00X' where a value greater than zero corresponds to a '1', a value less than zero corresponds to a '0', and a value of zero is indeterminate. In such a case, the appropriate sync mark is less likely to be detected as some bits are indeterminate. Alternatively, where retrieved data 570 is inverted, the selected best phase where the retrieved data is not inverted would yield the following samples: [ . . . 20, 20, 20, −20, −20, −20, 20 . . . ]. The first three '20s' are indicative of the maximum peak of the last bits of the preamble preceding the sync mark, and the three '−20s' and following '20' represents the sync mark '0001' where a value greater than zero corresponds to a '1' and a value less than zero corresponds to a '0'. Thus, using the best phase information provided via multiplexer 525, sync mark detector 531 is able to identify the sync mark where the signal polarity is incorrect.

Regardless of the polarity of retrieved data 570, both paths 592, 594 process in parallel using accumulators 552 to create a sum of the absolute values associated with the sync mark. Thus, for example, where the sync mark '0001' is associated with the following series of samples '−20, −20, −20, 20'; the sum of the absolute values formed by a respective accumulator is eighty indicating that the sync mark was detected. Alternatively, where the sync mark 'X00X' is identified from the following series of samples 0, −20, −20, 0; the sum of the absolute values formed by a respective accumulator is forty indicating that the sync mark was not detected. Said another way, where retrieved data 570 is not inverted, accumulator 552a will yield a value greater than that of accumulator 552b. In contrast, where retrieved data 570 is inverted, accumulator 552a will yield a value less than that of accumulator 552b. Comparator 550 receives the values from accumulators 552 and provides polarity indicator output 590 indicating which of paths 592, 594 is providing a data stream of the proper polarity. It should be noted that the same sync mark may be detected by both data paths due to the indeterminate nature of one of the sync marks. In such a case, the sum of absolute values acts as an arbiter between the two identified sync marks.

In addition, sync mark detector circuits 530, 531 provide an indication to associated data detector circuits 532, 533 indicating that data is available as part of the stream of digital values received from multiplexers 524, 525. The stream of digital values is sampled by data detector circuits 532, 533 using the synchronized sample clock, and the samples are provided to multiplexer 560 respectively as data streams 582, 584. Based on polarity indicator output 590, one or the other of data streams 582, 584 is passed by multiplexer 560 as data output 580. Data detector circuit 533 may be used to invert the individual bits of data stream 584 such that data output 580 is always positive polarity, or other circuitry may use polarity indicator output 590 to trigger an appropriate inversion of data output 580.

In conclusion, the present invention provides novel systems and methods for detecting, compensating and/or correcting data received from a variable polarity data source. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for accessing data using a variable polarity head assembly, the method comprising:
   receiving a data set;
   sampling the data set to create a first sample set, wherein the first sample set is formed using a positive synchronization, and wherein the positive synchronization is achieved by a first phase lock loop synchronizing to the maximum peaks of a portion of the data set;
   identifying a portion of the first sample set corresponding to a first sync mark;
   sampling the data set to create a second sample set, wherein the second sample set is formed using a negative synchronization, and wherein the negative synchronization is achieved by a second phase lock loop synchronizing to the maximum peaks of an inverted portion of the data set;
   identifying a portion of the second sample set corresponding to a second sync mark; comparing the first sync mark with the second sync mark;
   based at least in part on the comparison of the first sync mark and the second sync mark, determining a polarity of the data set.

2. The method of claim 1, wherein comparing the first sync mark with the second sync mark includes summing the individual samples of the first sync mark to create a first sync sum, summing the individual samples of the second sync mark to create a second sync sum, and comparing the magnitude of the first sync sum with the magnitude of the second sync sum, wherein negative polarity of the data set is indicated where the first sync sum is less than the second sync sum, and wherein positive polarity is indicated where the first sync sum is greater than the second sync sum.

3. The method of claim 2, wherein summing the individual samples of the first sync mark includes summing the absolute values of the individual samples of the first sync mark, and wherein summing the individual samples of the second sync mark includes summing the absolute values of the individual samples of the second sync mark.

4. The method of claim 2, wherein application of a common threshold to the individual samples of the first sync mark and the individual samples of the second sync mark yields the same sync mark.

5. The method of claim 1, wherein the data set is wide biphase coded.

6. The method of claim 1, wherein the first sync mark is preceded in the data set by a first preamble, and wherein the second sync mark is preceded by a second preamble.

7. The method of claim 6, wherein the positive synchronization is achieved by a first phase lock loop synchronizing to the maximum peaks of the first preamble, and wherein the negative synchronization is achieved by a second phase lock loop synchronizing to the minimum peaks of the second preamble.

8. The method of claim 1, wherein the method further comprises: based on the determined polarity of the data set, delivering the data set in a known polarity selected from a group consisting of: a positive polarity and a negative polarity.

9. A data storage system, the system comprising:
   a first data path, wherein the first data path includes:
      a first synchronization element, wherein the first synchronization element is operable to synchronize to a first phase of a frequency of a received data stream, and wherein the first synchronization element synchronizes to maximum peaks of a non-inverted version of the received data stream;
      a first sampling element, wherein the first sampling element is operable to sample the received data stream and to create a first sample set based on an input from the first synchronization element; and
      a first sync detector, wherein the first sync detector is operable to identify a first sync mark in the first sample set;
   a second data path, wherein the second data path includes:
      a second synchronization element, wherein the second synchronization element is operable to synchronize to a second phase of the frequency of the received data stream, and wherein the second synchronization element synchronizes to a data set selected from a group consisting of: minimum peaks of a non-inverted version of the received data stream, and maximum peaks of an inverted version of the received data stream;
      a second sampling element, wherein the second sampling element is operable to sample the received data stream and to create a second sample set based on an input from the second synchronization element; and
      a second sync detector, wherein the second sync detector is operable to identify a second sync mark in the second sample set;
   a comparator, wherein the comparator is operable to compare the first sync mark with the second sync mark, and to output an indication of the polarity of the received data stream.

10. The data storage system of claim 9, wherein the data storage system further comprises:
    a storage medium; and
    a read head disposed in a read proximity to the storage medium, wherein the received data stream is provided from the storage medium via the read head.

11. The data storage system of claim 9, wherein the first phase is approximately one hundred eighty degrees out of phase from the second phase.

12. The data storage system of claim 9, wherein the system further comprises:
    a first accumulator, wherein the first accumulator is operable to sum the individual samples of the first sync mark to create a first sync sum; and
    a second accumulator, wherein the second accumulator is operable to sum the individual samples of the second sync mark to create a second sync sum.

13. The data storage system of claim 12, wherein comparing the first sync mark with the second sync mark includes comparing the first sync sum with the second sync sum.

14. The data storage system of claim 12, wherein the system further includes a data server element, wherein the data server element is operable to provide an output data stream based at least in part on at least one of the first sync sum and the second sync sum, and wherein the output data stream is derived from the received data stream.

15. The data storage system of claim 9, wherein the first sync mark is preceded in the data set by a first preamble, and wherein the second sync mark is preceded by a second preamble.

16. The data storage system of claim 15, wherein the first synchronization element is a first phase locked loop a frequency of the first preamble as a reference, and wherein the second synchronization element is a second phase locked loop a frequency of the second preamble as a reference.

17. A data access system, the system comprising:
an analog to digital converter, wherein the analog to digital converter provides an input data stream;
a plurality of digital interpolation filters, wherein each of the plurality of digital interpolation filters interpolate the input data stream and provide respective interim data streams at respective phases;
a first data path, wherein the first data path includes:
a first synchronization element, wherein the first synchronization element receives the input data stream and one or more of the interim data streams, wherein the first synchronization element is operable to synchronize to a first phase of a frequency of the input data stream, and wherein the first synchronization element synchronizes to a first data set selected from a group consisting of: minimum peaks of a non-inverted version of the input data stream, and maximum peaks of an inverted version of the input data stream;
a first sampling element, wherein the first sampling element is operable to sample the received data stream and to create a first sample set based on an input from the first synchronization element; and
a first sync detector, wherein the first sync detector is operable to identify a first sync mark in the first sample set;
a second data path, wherein the second data path includes:
a second synchronization element, wherein the second synchronization element receives the input data stream and one or more of the interim data streams, and wherein the second synchronization element is operable to synchronize to a second phase of a frequency of the input data stream, and wherein the second synchronization element synchronizes to a second data set selected from a group consisting of: minimum peaks of a non-inverted version of the input data stream, and maximum peaks of an inverted version of the input data stream;
a second sampling element, wherein the second sampling element is operable to sample the received data stream and to create a second sample set based on an input from the second synchronization element; and
a second sync detector, wherein the second sync detector is operable to identify a second sync mark in the second sample set;
a comparator, wherein the comparator is operable to compare the first sync mark with the second sync mark, and to output an indication of the polarity of the received data stream.

18. The data access system of claim 17, wherein the system further includes a data server element, wherein the data server element is operable to provide an output data stream based at least in part on at least one of the first sync sum and the second sync sum, and wherein the output data stream is derived from the received data stream.

19. The data access system of claim 17, wherein the first synchronization element is a phase lock loop circuit.

20. The data access system of claim 19, wherein the phase lock loop circuit is a first phase lock loop circuit, and wherein the second synchronization element is a second phase lock loop circuit.

* * * * *